Nov. 21, 1944.  H. E. GOLBER  2,363,314
SLOTTING MACHINE
Filed Oct. 7, 1942     9 Sheets-Sheet 3
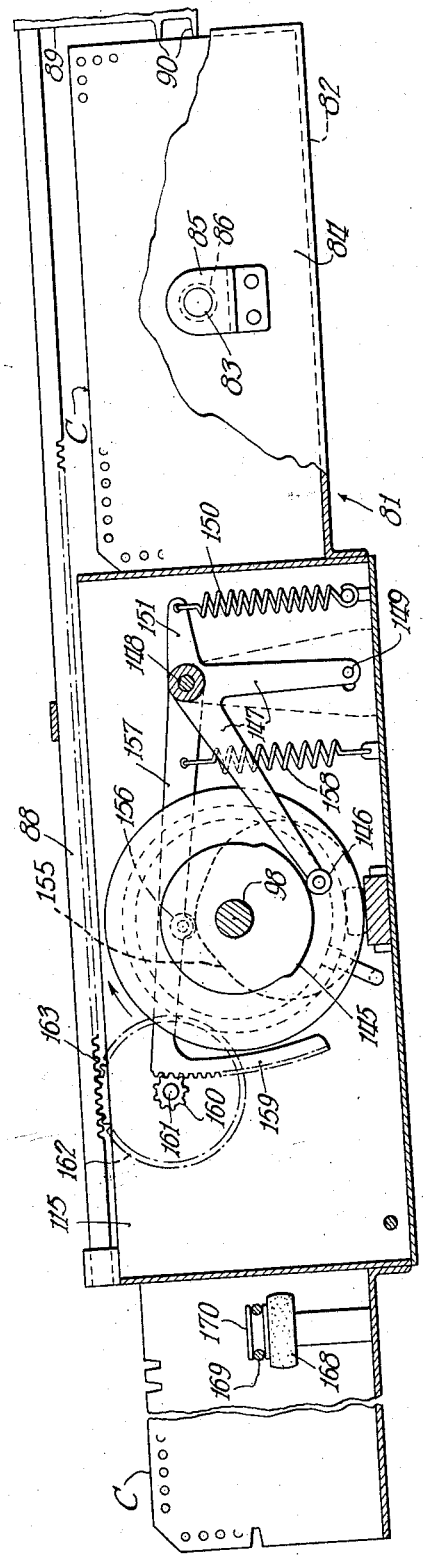
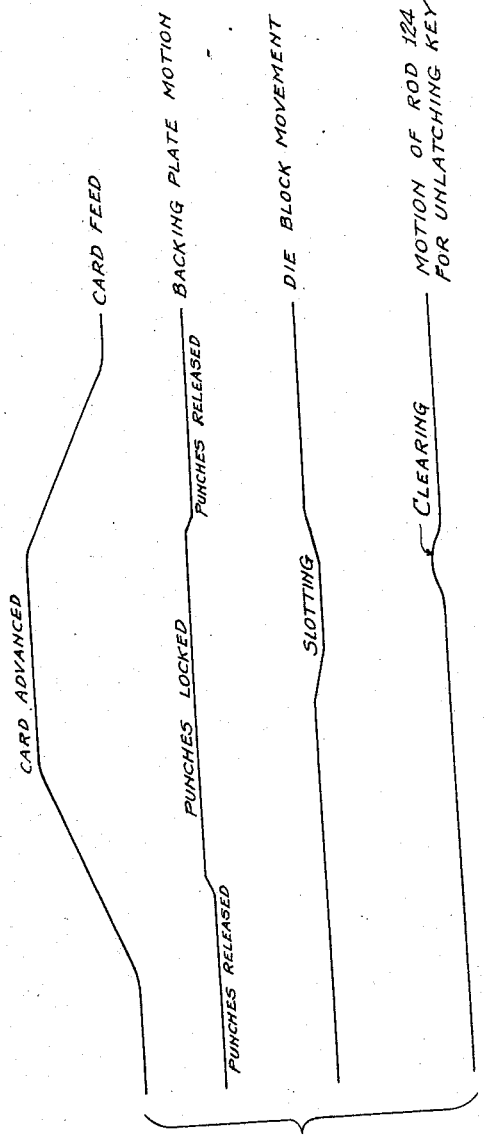
Inventor
Hyman E. Golber
By
Attys.

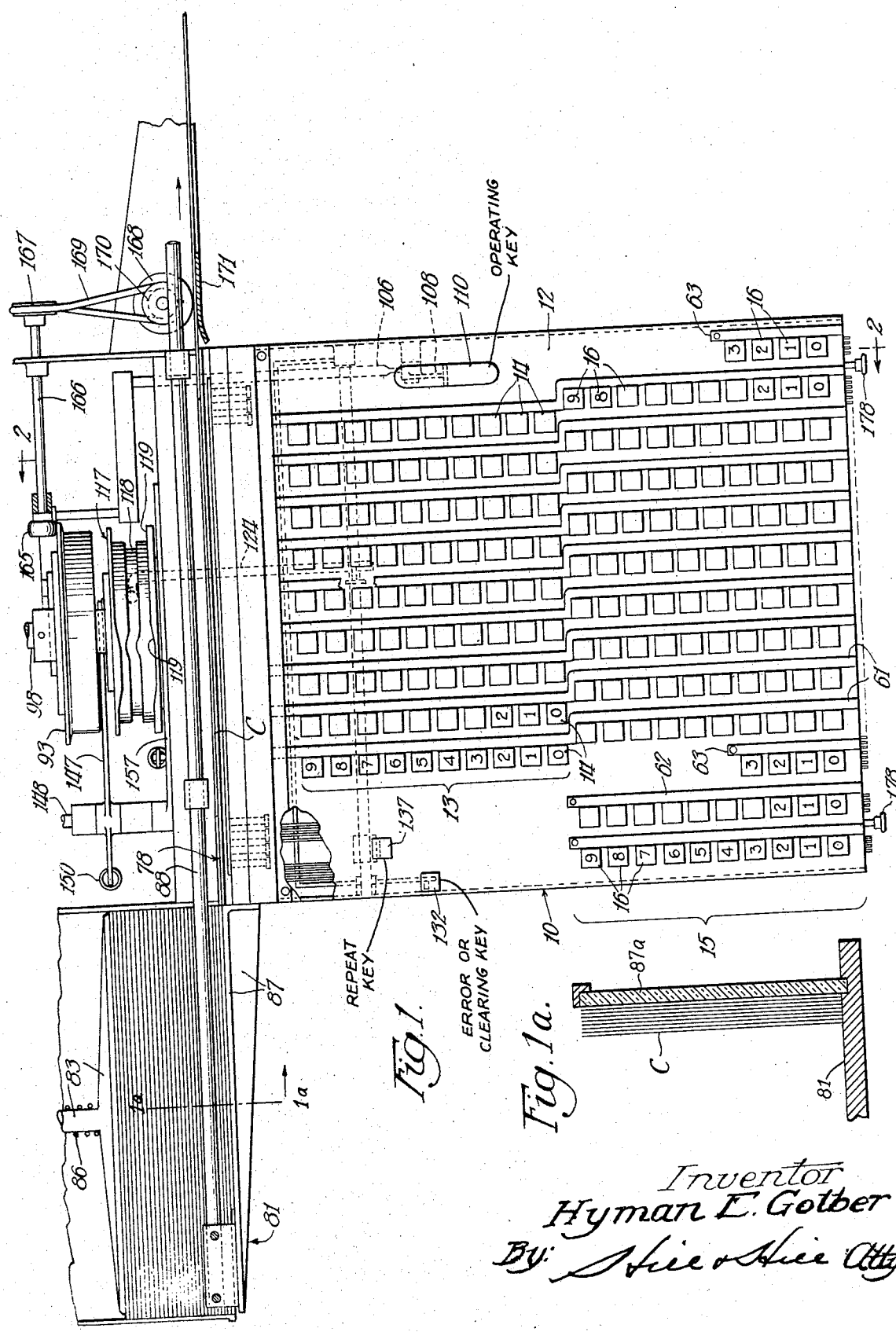

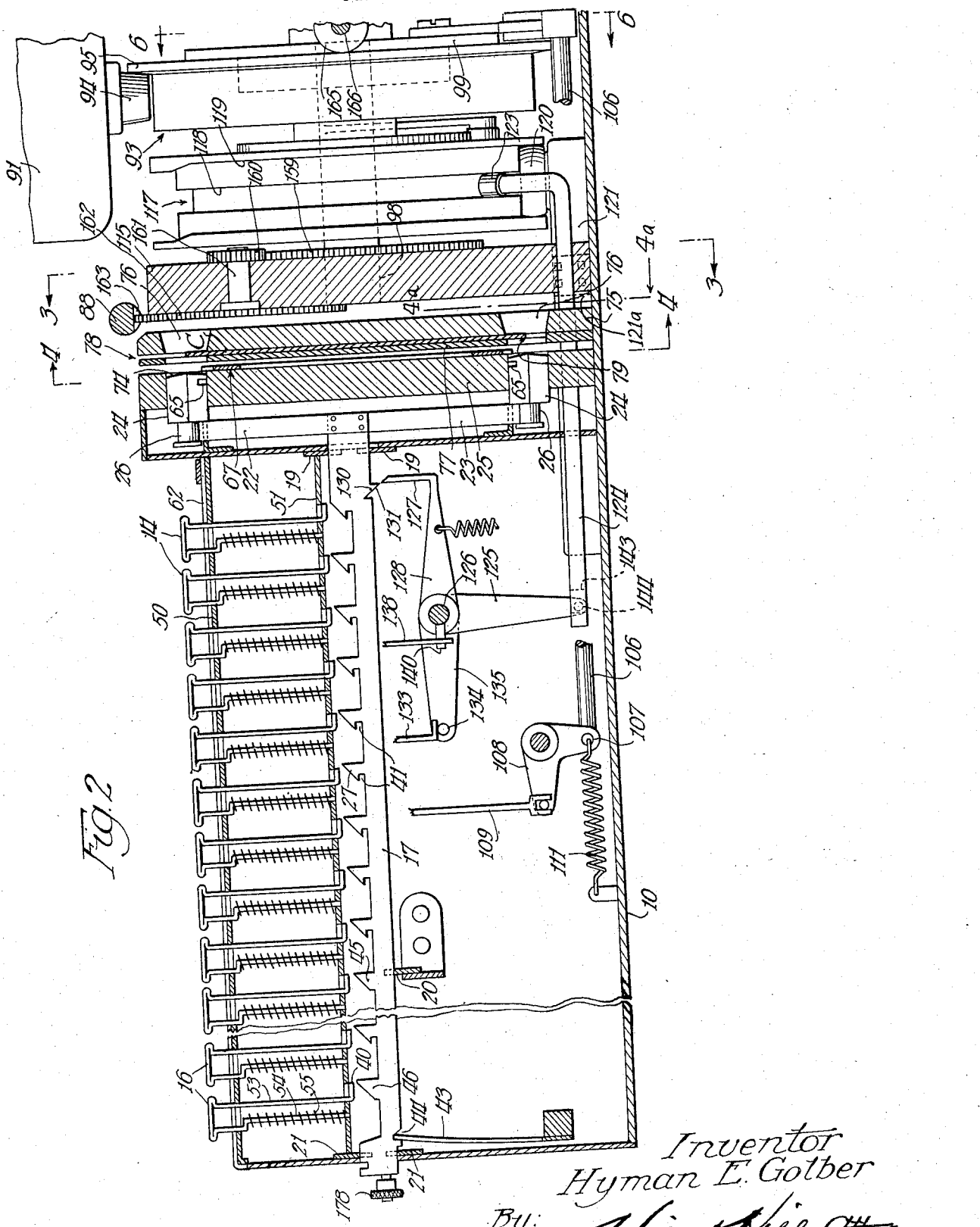

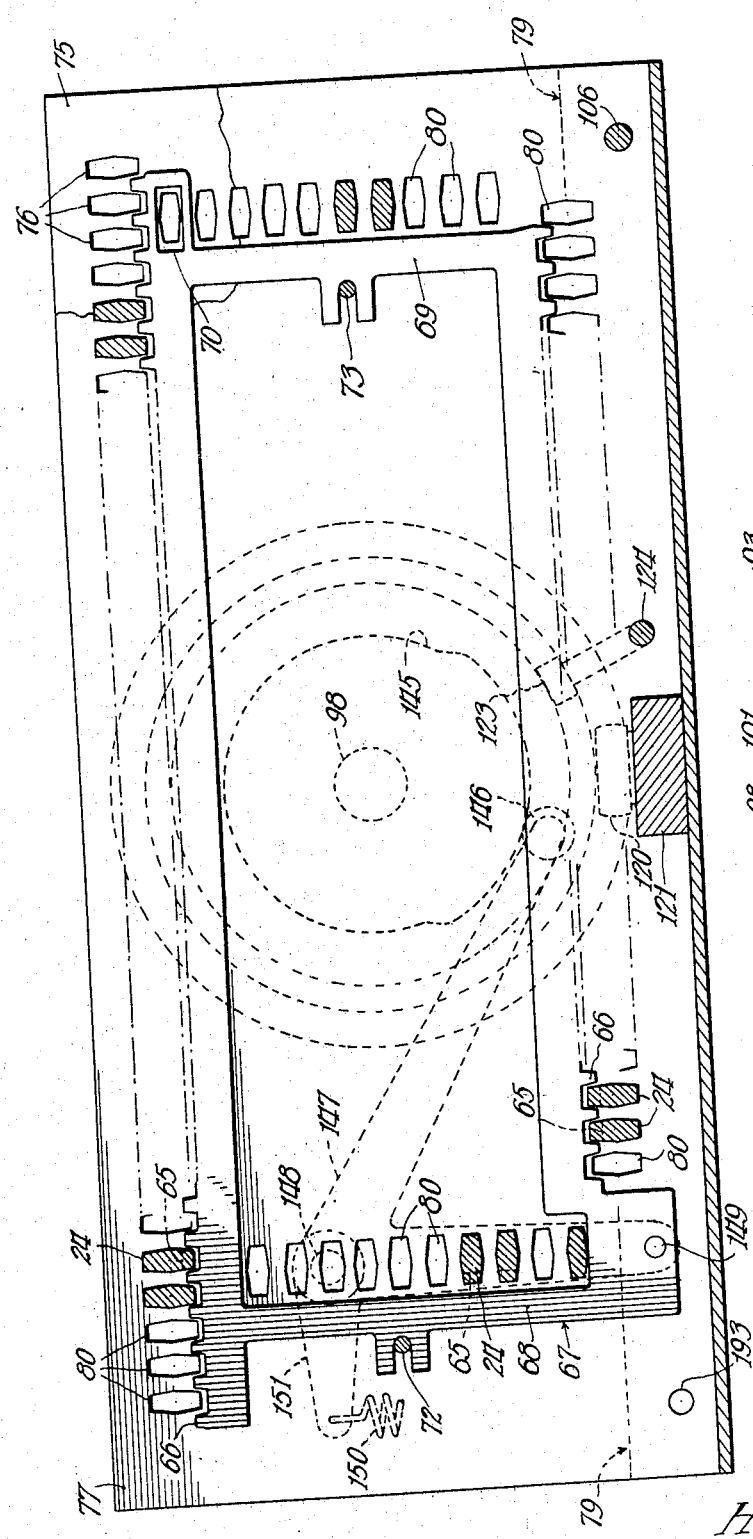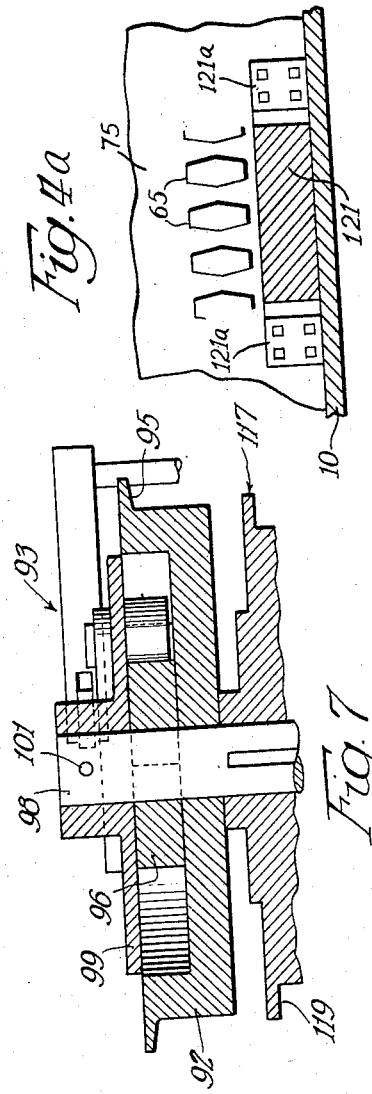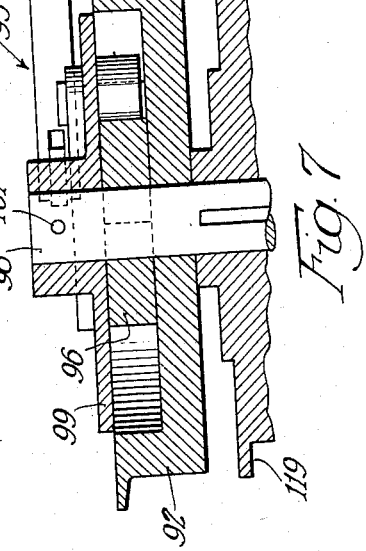

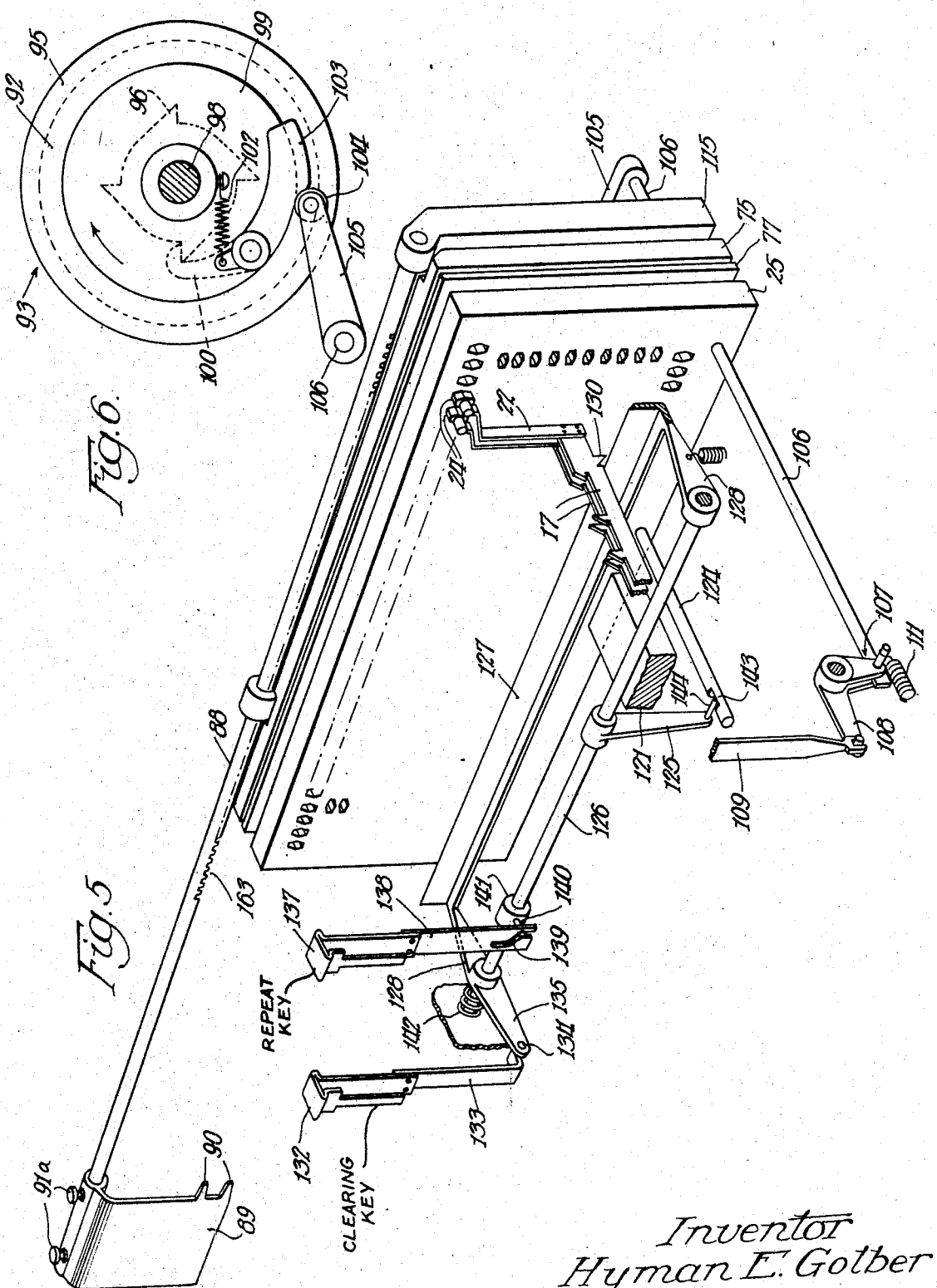

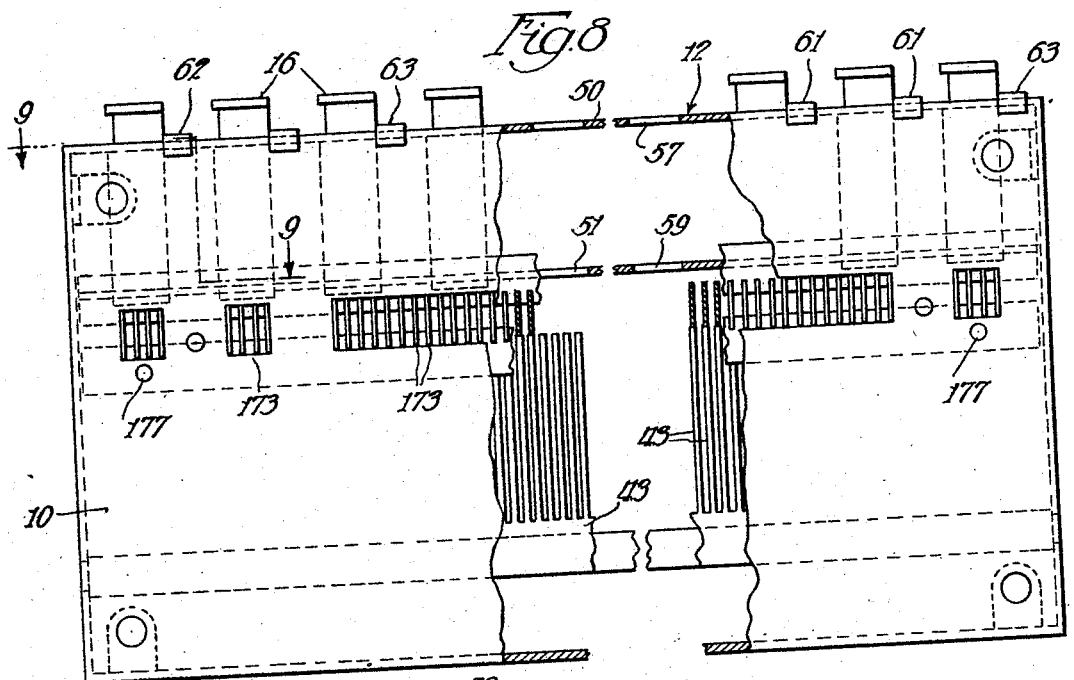

Nov. 21, 1944.  H. E. GOLBER  2,363,314
SLOTTING MACHINE
Filed Oct. 7, 1942  9 Sheets-Sheet 7
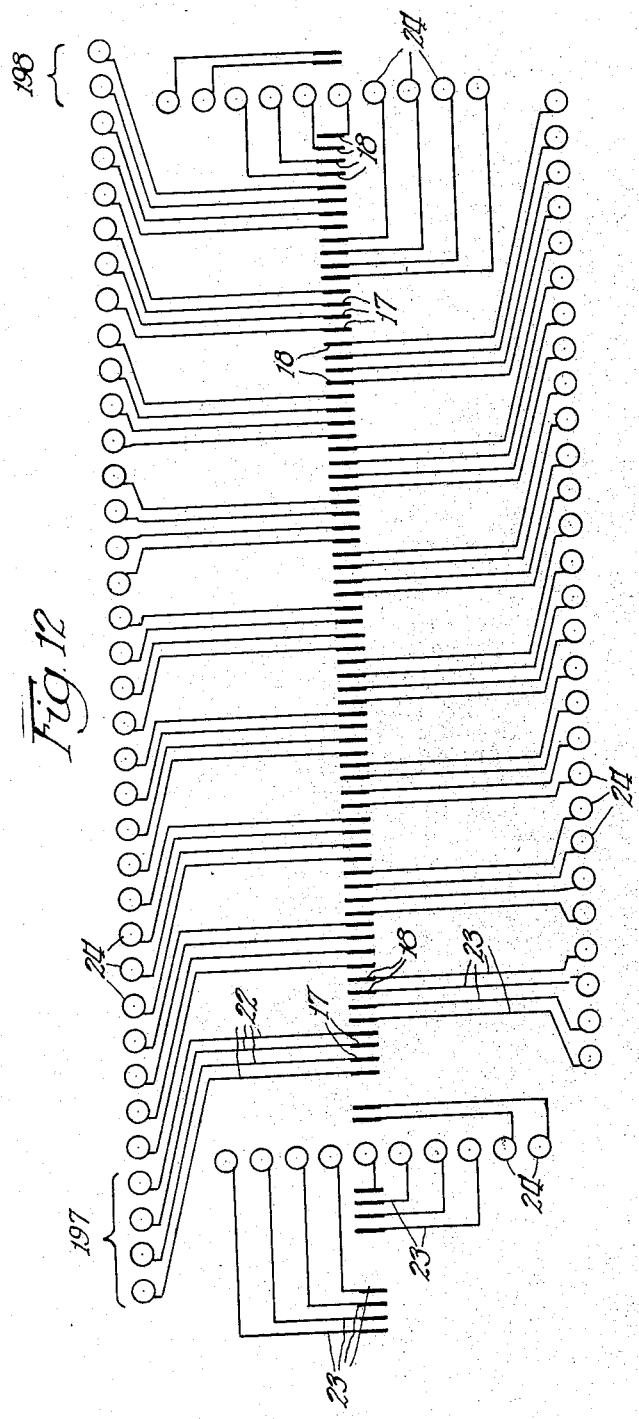
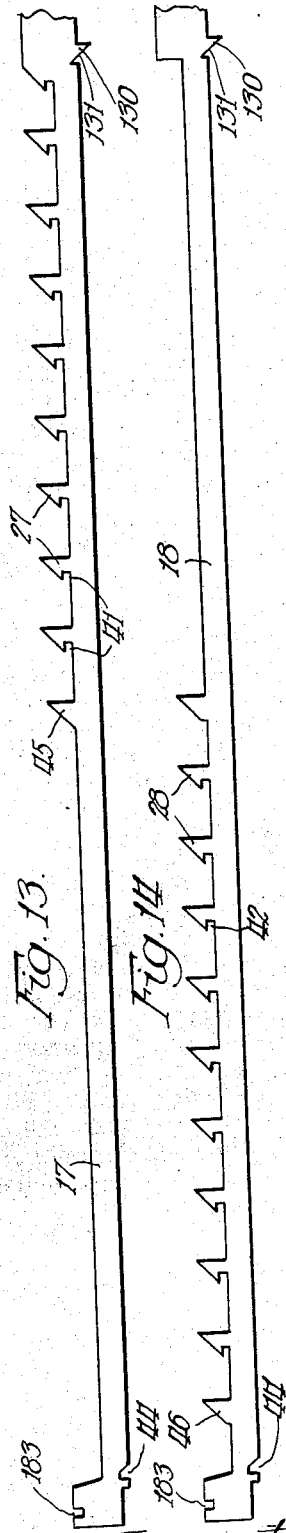
Inventor
Hyman E. Golber
By: Nice & Nice Attys.

Nov. 21, 1944.  H. E. GOLBER  2,363,314
SLOTTING MACHINE
Filed Oct. 7, 1942  9 Sheets-Sheet 8
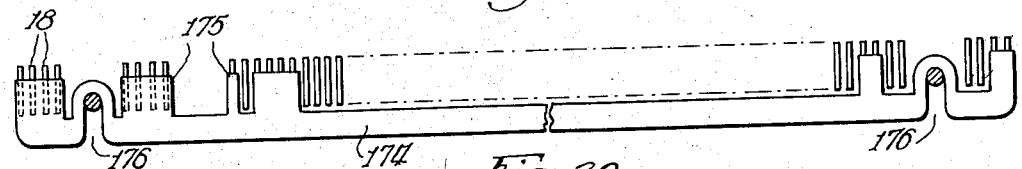
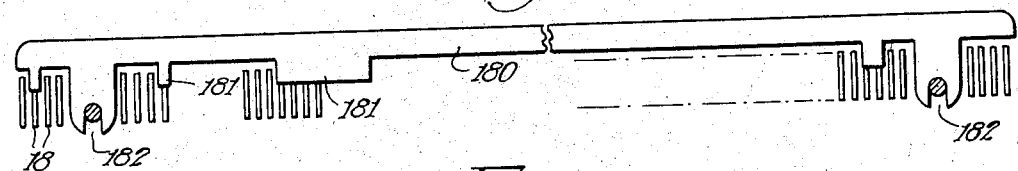
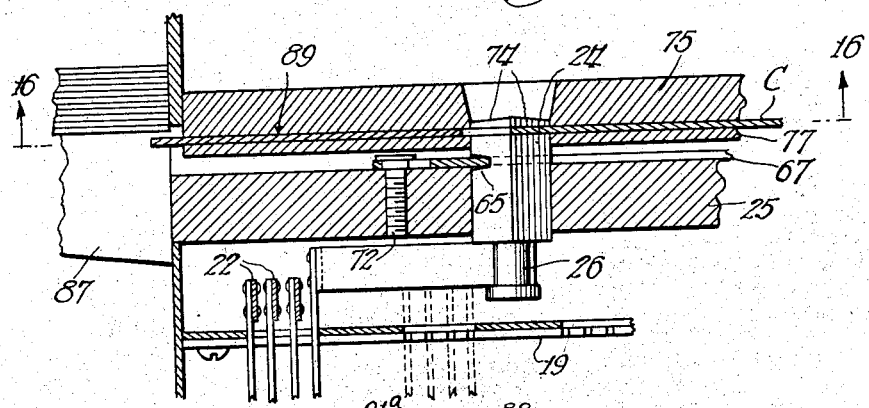
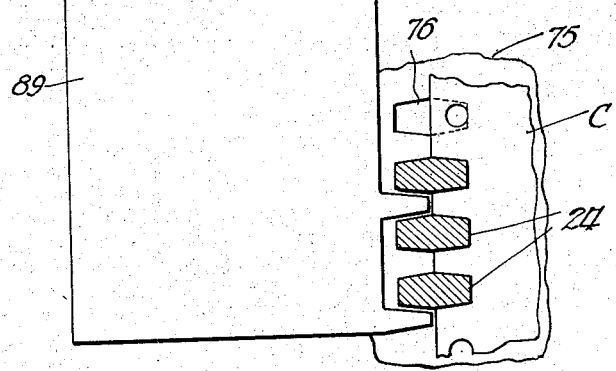
Inventor
Hyman E. Golber
By Nov. 21, 1944.  H. E. GOLBER  2,363,314
SLOTTING MACHINE
Filed Oct. 7, 1942  9 Sheets-Sheet 9

Inventor
Hyman E. Golber
By: Hие & Hие  Attys.

Patented Nov. 21, 1944

2,363,314

UNITED STATES PATENT OFFICE 2,363,314

SLOTTING MACHINE

Hyman E. Golber, Chicago, Ill., assignor to Multi-Sort Systems Incorporated, Chicago, Ill., a corporation of Illinois Application October 7, 1942, Serial No. 461,177

39 Claims. (Cl. 164—112)

The present invention relates to a slotting machine and is more particularly directed to certain new and useful improvements incorporated in a machine which is adapted for notching perforated cards of indexing systems or the like. There are numerous cards on the market of various sizes which are peripherally perforated in a manner as to segregate certain groups of perforations for the purpose of ultimately notching out certain of these perforations to thereby code these cards in direct relation to the information that is written upon the card or collaterally obtained and relating thereto during the usual course of business. Briefly, therefore, these cards provide an efficient and simple means for classifying the data contained thereon and by subsequently employing various types of needle selectors, it is possible to quickly sort the cards according to certain classifications or according to certain information which shall be common to the selected group of cards. For the purpose of demonstrating the present invention, the machine herein shown and described has been adapted for use in connection with a card of rectangular shape and measuring 3¼ inches wide and 7½ inches long. This particular size of card has been selected for the simple reason that a card of this size seems to be broadly used and might be termed "a standard card" for the purposes of explanation.

There are a number of improvements resulting in definite advantages which are incorporated in the present machine and one of the main objects of the latter is to provide a plurality of punches arranged in a rectangle for the purpose of operatively notching a perforated card along any edge or any one or more edges thereof in one simultaneous punching operation. Obviously, one or more punches may be brought into such operative relation depending directly upon the selection of punches made in accordance with the information to be contained upon each particular card. The cards to be notched for coding are usually placed where each card may be viewed by the operator and in the present machine the cards are fed from a magazine at one side of the machine with the front card supported in full view of the operator and also positioned at one side of the machine prior to being fed into a predetermined relation with respect to the punching mechanism.

Another object of the present invention is to provide a full keyboard wherein the keys may be grouped for the convenience of the operator whether arranged in open rectangular formation to imitate the general lines of the index card perforations or wherein the keys may be arranged or positioned in any other predetermined grouping or to follow some definite geometric layout. In the machine of the present construction the keys are arranged in two contiguous rectangularly positioned groups for the convenience of the operator as will hereinafter be explained, and each punch or group of punches will be directly associated or connected with and identified by a definite key.

Another object of the present machine is to definitely preposition an index card with the perforations thereof coincident with the plurality of punches but spaced therefrom, and to provide mechanism whereby in operating certain selected keys, corresponding punches or groups of punch keys, corresponding punches or groups of punches shall be advanced into operative position in relation to one side of the card, and to provide a cooperative die block and associated mechanism which will be disposed at the opposite side of the card to function as a means for bodily moving the card towards and over the advanced punches to simultaneously notch the perforations which correspond to the advanced punches to code the card in one punching operation.

Another object of the present invention is the provision of means for automatically feeding cards into the machine at the beginning of each punching operation. The cards are disposed in a tray or magazine at one side of the machine before notching, while after notching and at the end of each cycle of operation, the completely punched card will remain in the machine and then this card will be ejected from the machine by the next advancing unpunched card. One card will always be in place in the machine but the same may also be ejected by feeding through a blank or otherwise unused or unpunched card.

The machine is substantially automatic in operation after the keyboard has been set up to code the card. Prior to the cycle of operation, the operator will set up the keyboard by pressing certain selected keys which lock in depressed position, such keys being selected according to the information which may be read from the front card in the magazine or from other supplemental and collateral information directly relating to that particular card, and thereafter the operator pushes the control bar which sets the machine in motion for notching said front card of the magazine. The cycle of operation after setting up the keyboard and pressing the control key is substantially as follows: The front card in the magazine is advanced into the machine pushing the previous card before it out of the machine; the key advanced punches are locked into place by a backing plate; then the card is moved perpendicular to the plane of its face by a die block to engage the advanced punches to be notched thereby; the card is then retracted off of the punches by a suitable stripper plate carried by the die block and, finally, the machine is automatically cleared by suitable mechanism which releases the depressed and latched keys of the keyboard and restores the punch mechanism to its normal retracted and inoperative position. This notched card will subsequently be ejected from the machine by the next advancing card and in order that all of the notched cards that are operated on by the machine may be ejected therefrom, it may be preferable to provide a blank card at the end of each stack of cards in the magazine whereby the operation of such blank card will eject the last of the notched or coded cards.

Another object of the present machine is to provide a suitable spacer which may be inserted into the machine in the space normally occupied by each successive standard card as hereinbefore referred to, which spacer will act to support smaller cards with the lower edges thereof coincident with the median line of the upper row of notching punches. For this purpose, the upper row of punches is provided with double sided punches that serve to notch the bottom of a card disposed upon the spacer above referred to and the same punches are normally used to punch the upper edges of the standard cards normally fed automatically into the machine when the spacer is not in use. It is also a feature to increase the number of punches in this upper row to accommodate cards that may be supported at the upper row of punches by the spacer. The remaining punches of the machine may be made as double or single sided punches depending upon requirements and for mechanical reasons as desired. The spacer referred to is used to support smaller or larger cards than the standard card, but the main utility thereof resides in supporting cards of less height than the standard card height of 3¼ inches in a position accessible to the hand, otherwise such smaller cards would drop into the usual card space of the machine and out of reach.

A further feature of the present invention is the provision of an external templet which may be readily secured to the machine and removed therefrom, such template functioning to pre-set certain single punches or combinations of punches thereby providing a means for notching one or more cards in duplicate. The duplication will of course be governed by the exact shape of the template, and such cards may also be further notched by supplementing the combination set up by the pre-setting templet by hand setting open or free keys that are not affected by the templet setting.

Another feature similar to the foregoing is the provision of a templet of predetermined shape which may also be attached to and removed from the machine as desired, this templet functioning as a means for blocking certain individual punches or groups of punches to prevent the operation thereof when hand setting the keys. When a blocking templet is used, the keyboard is free for hand operation, but the keys directly connected with the blocked punches shall be rendered inoperable by the latter templet. The use of a mask that may be superimposed over the keyboard and provided with suitable openings for permitting the operation of certain keys is also contemplated.

Among some of the other novel features incorporated in a machine of this type is the provision of a repeating mechanism for automatically notching two or more cards with the same combination of punches as set up by hand on the keyboard of the machine. The machine is also constructed to include a means for supplementing the automatic clearing of the machine. By such a means, the operator may at any time release the depressed keys which have been selected on the keyboard in case of error or for any other reason that may require the releasing of the keys.

All other objects and advantages shall hereinafter be referred to in the following detailed description of the invention having specific reference to the accompanying drawings illustrating a preferred disclosure of the machine of the present invention.

In the drawings:

Fig. 1 is a general plan view of the machine illustrating the relative locations of the various operating mechanisms and a preferred grouping and arrangement of the operating keys.

Fig. 1a is a detail vertical fragmental section of the card magazine taken on the line 1a—1a of Fig. 1.

Fig. 2 is a longitudinal cross-sectional view through the machine as taken substantially along the line 2—2 in Fig. 1 and looking in the direction of the arrows.

Fig. 3 is a transverse sectional view looking from the rear toward the front of the machine, the section being taken substantially along the line 3—3 in Fig. 2.

Fig. 4 is a sectional view taken substantially along the line 4—4 in Fig. 2 to illustrate the general arrangement of the backing plate, the card stripper and die block.

Fig. 4a is a detail vertical fragmental section of a certain slide taken on the lines 4a—4a of Fig. 2, and showing its connection with a certain die plate.

Fig. 5 is a diagrammatic perspective view of the card punching mechanism, card feed and certain of the linkages connected with the repeat and clearing keys of the machine.

Fig. 6 is a face view of the single revolution clutch which is utilized for driving the mechanisms of the machine through each complete cycle of operation substantially as viewed on line 6—6 in Fig. 2.

Fig. 7 is a plan sectional view of the clutch and as viewed in the same relation as the clutch is shown in Fig. 1.

Fig. 8 is a front elevational view of the main body of the machine partially broken away and in section to show the arrangement of certain of the internal mechanisms thereof.

Fig. 9 is a fragmentary horizontal sectional view through the keyboard portion of the machine as taken substantially along the line 9—9 in Fig. 8.

Fig. 10 is a cross-sectional view of the forward end of a key bar on an enlarged scale for illustrating the application of the pre-setting and blocking templates.

Fig. 11 is similar to Fig. 10, but demonstrates a changed position of the key bar when the presetting template has been operatively secured into place against the machine.

Fig. 12 is a diagrammatic view of the general arrangement of all the key bars in the transverse plane of the machine looking rearwardly of the machine and the arrangement and disposition of the arms of each of the key bars, and showing the manner in which the arms terminate adjacent the various punches which are generally indicated by the circles.

Fig. 13 is a side elevational view of one form of key bar which is adapted to cooperate with the individual keys in the rows of the upper keyboard.

Fig. 14 is also a side elevational view of another key bar and this key bar is adapted for cooperation with the keys in the rows of the lower keyboard.

Fig. 15 is a fragmentary horizontal sectional view illustrating the relation of the die block, the punches, and the means for feeding the card therebetween.

Fig. 16 is a face view of the card feeding finger illustrating the position the same occupies when in its advanced position.

Fig. 17 is a general diagrammatic view illustrating the co-related actions of the cams during the cyclic operation of the machine.

Fig. 18 is a face view of a perforated index card of the kind normally employed to be notched by the present machine.

Fig. 19 is a sectional view through the keyboard parallel to one of the keys as taken substantially along the line 19—19 in Fig. 9.

Fig. 20 is a side elevational view of said key as viewed along the line 20—20 in Fig. 19.

Figs. 21 to 24 inclusive are plan sectional views of the key ends of the four primary keys illustrating the key bar operating fingers thereon.

Figs. 25 to 30 inclusive, are sections similar to those in Figs. 21 to 24, but illustrating the secondary keys having the combinations of key bar operating fingers.

Fig. 31 is a diagrammatic illustration of a presetting template also showing the approximate position occupied thereby in relation to the ends of the key bars.

Fig. 32 is similar to Fig. 31 but illustrates one form of blocking template such as may be utilized for blocking certain notching punches or groups of punches, and Fig. 33 is a side elevational view of a spacer such as may be employed for supporting odd sized cards when notching the bottom edges of these cards with the upper half of the upper row of punches.

Referring to Fig. 1 of the drawings, the machine is enclosed by a casing 10 supporting a keyboard 12 having an upper group or rearwardly disposed set of keys indicated generally by 13 with the individual keys designated by 14; and a lower group of keys extending forwardly of the machine and generally indicated by the reference numeral 15 with the individual keys indicated at 16. Each of the groups of keys 13 and 15, respectively, are divided into decimal columns or row of keys extending fore and aft of the machine and ranging from zero to nine inclusive, marked as indicated in Fig. 1 to provide indicia required to guide the operator in setting up the keyboard when coding each card. In the lower or forwardly disposed group of keys 15, two of the rows thereof are only provided with four keys to accommodate certain incomplete groups of perforations on the cards, such a card per se being individually represented in Fig. 18. In Fig. 18 it should be noted that most of the perforations are divided into groups of four perforations, each group being designated by some form of indexing means as the letters indicated thereon, and each perforation in the groups being numbered with the primary numbers 1, 2, 4 and 7, while the incomplete groups of only two perforations may be numbered 1 and 2 or in any other manner most convenient and practical for the proper coding of a card.

Referring back to Figs. 1 and 2, each vertical column or row of keys 14 in the upper group 13 is provided with a plurality of key bars 17 as shown in Figs. 2 and 13. The lower group 15 has each column or row of keys 16 provided with key bars 18 as in Figs. 2 and 14 all of said key bars being slidably mounted and carried by the casing 10 through the instrumentality of the comb guide members 19, 20 and 21, respectively, secured to the casing in any convenient manner. The key bars are preferably arranged in groups of four abreast substantially as best shown in the diagram of Fig. 12 with each group of four bars underlying a column of keys of the keyboard. The key bar groups are also segregated so that each group of four which cooperates with one of the columns or rows of keys in the upper keyboard will contain four bars such as 17 illustrated in Fig. 13, while the groups of bars which underlie the key columns or rows of the lower keyboard will be four bars like 18 as in Fig. 14. It is also seen from Fig. 12 that where groups of perforations are less than four in number, also referring to Fig. 18 showing the card, such perforations only need two bars which will underlie the rows having a smaller number of keys such as shown in Fig. 1. To aid in arranging the placement of all of the key bars 17 and 18, the upper columns or rows of keys 14 are positioned in staggered relation to the lower columns or rows of keys 16. This also aids the operator in setting up the keyboard for notching a card.

The key bars 17 are each provided with arms 22 connected with the rear ends thereof while the key bars 18 carry similar arms 23, and all of said arms are suitably bent and shaped to connect with the slotting punches 24 which are all slidably carried in the supporting plate 25 mounted on the casing 10 of the machine. The punches 24 are provided with annular rings 26 and the ends of the arms 22 and 23 are positioned within the annular rings 26 of the respective punches whereby the punches 24 move directly with such arms. The manner in which the arms 22 and 23 are shaped and arranged for meeting the various punches 24 is best indicated in the diagram, Fig. 12.

The key bars 17 and 18 are each provided with cam lugs 27 and 28, respectively, which are adapted for cooperating with the keys 14 and 16, respectively. All of the keys 14 and 16 of the keyboard are of identical construction with the exception of the cam lug operating fingers 30 which vary according to the combinations illustrated in Figs. 21 to 30 inclusive. In Figs. 21 to 30 inclusive, the various fingers 30 of each key and their various combinations are indicated in terms of the primary Nos. 1, 2, 4 and 7, and the keys in the columns of the keyboard which are numbered from zero "0" No. 1, etc., inclusive, to No. 9, carry the fingers shown in Figs. 21 to 30 in the following manner: In Figs. 21 to 30, 31 indicates the No. 1 key, 32 indicates the No. 2 key, 33—No. 3 key, 34—No. 4 key, 35—No. 5 key, 36—No. 6 key, 37—No. 7 key, 38—No. 8 key, 39—No. 9 key, and 40 refers to the zero "0" key. These combinations prevail for either the upper or lower keyboard of the machine and each row of keys from zero "0" to No. 9 inclusive is disposed in superimposed position with respect to each group of four key bars, with the groups of key bars relating to the upper columns of keys being of the kind illustrated at 17 in Fig. 13, and with the groups of key bars relating to the lower columns of keys being of the kind illustrated at 18 in Fig. 14. It is to be seen that each of the bars 17 and 18 has the same number of cam lugs 27 and 28 to correspond with the number of keys in each column of the upper and lower keyboards respectively, and the movement of any one key will cause the finger or fingers carried by said key to contact one of the lugs of its corresponding key bar, thereby actuating said key bar or key bars longitudinally of the machine to advance the punch 24 or punches 24 corresponding to said individual or combination of bars actuated.

Upon operation of any key, such as carries any one of the individual or primary fingers indicated in Figs. 21 to 24 inclusive, it is obvious that individual key bars will be advanced to place the respective punches to which they are connected into operation relation, namely, in a position projecting beyond the rear surface of the supporting plate 25. Also by operating any of the keys illustrated in Figs. 25 to 29 which correspond to the key markings of 3, 5, 6, 8, 9, respectively, each key by its corresponding combination of fingers will actuate two bars simultaneously to move two punches into advanced operation position with respect to the supporting plate 25. Also, in addition, each of the cam lugs 27 and 28 of the key bars 17 and 18 are undercut as at 41 and 42, respectively, for latching the bar operating fingers to hold the depressed keys in their depressed positions whenever operated. This latching effected by the action of the comb spring 43 which is suitably secured to the casing 10 of the machine transversely thereof with each of the individual fingers of said spring engaging one of the plurality of key bars within the notches 44 in said bars. The comb spring 43 also functions to normally maintain all of said key bars in their normal inoperative and retracted positions which also disposes all of the punches 24 in their inoperative and retracted positions within the supporting plate 25.

Each of the key bars 17 and 18 carries one cam lug 45 and 46, respectively, which corresponds to the zero "0" key of the keyboard and this cam lug in each of the key bars is not undercut and, therefore, will not retain the zero key in depressed position. Referring to Fig. 30, the zero key is provided with the finger 40 which is of a length that will operate all four key bars which are slidably suspended beneath the particular row of keys to which any zero may apply, and by operating the zero key, the four bars associated therewith will be advanced to release any keys of the No. 1 to No. 9 group in that particular row and that may have been previously actuated or depressed in setting up their associated punches into operative relation with respect to the supporting plate 25. Since the lugs 45 and 46 of the key bars 17 and 18 are not undercut, the zero key, finger 40, shown in Fig. 30 will at all times return to its raised position on the keyboard whenever the same is operated. Therefore, the zero keys may be called or referred to as isolated clearing keys for each particular corresponding group of four key bars and may be considered as supplementing the total clearing mechanism which eventually clears the entire keyboard of the machine by releasing all of the depressed keys of both upper and lower keyboards simultaneously at the end of a cycle of operation of said machine.

Referring to Figs. 9, 19 and 20, each of the individual keys 14 and 16 are slidably carried by the upper and lower plates 50 and 51 of the keyboard 12. Each key is preferably made by a single metal stamping which is bent into the general U-shape indicated in Fig. 20 having a key top 52 with depending legs 53 and 54, leg 53 providing the supporting means for the various fingers 30 which cooperate with cam lugs of the respective key bars disposed beneath said keys, while the leg 54 provides a guide and holder for the spring 55 confined between the plate 51 and the offset shoulder 56 on the key for the purpose of normally maintaining the key in raised and in operative position.

Each of the keys 14 and 16 may be removed from the top of the keyboard which is an aid in assembling the keyboard of the machine as well as a convenience in future repairs whenever needed. In Fig. 9, it should be noted that the upper plate 50 is provided with the rectangular openings 57 which are adapted to receive the complete key end and its corresponding finger 30 therethrough, and each key is provided with a shoulder as at 58 in Fig. 19 that may be hooked under the plate 50 through slight lateral movement of the key after the latter has been inserted through the opening 57. The lower plate 51 of the keyboard 12 is provided with the pairs of openings 59 and 60 which cooperate respectively with the finger end 53 and spring end 54 of the keys to maintain the same in vertical slidable relation with respect to the keyboard. Suitable locking bars such as 61 are conveniently secured to the keyboard plate 50 in lateral abutting relation with respect to the edges of the keys as best illustrated in Fig. 1 for maintaining the shoulders 58 of each of the keys in operative locked engagement with respect to the upper plate 50 of the keyboard. As viewed in Fig. 1, the bars 61 are offset for the purpose of accommodating rows of keys in both of the upper and lower keyboards while certain shorter bars as at 62 and 63 have been employed for the purpose of maintaining certain of the other rows of keys as in the lower keyboards in their operative positions with respect to the keyboard 12.

The punches 24 may be made to assume various shapes and forms for the purpose of notching out the card edges adjacent each circular perforation as clearly illustrated in Fig. 18, and in the present form the punches are shaped as best illustrated in cross-section in Fig. 4 wherein several of the punches are so illustrated in their relative punching positions. Each of the punches is also provided with a slot 65 to be engaged by the teeth 66 suitably arranged and carried as best shown in Fig. 4 by a backing plate 67 whenever the punches 24 are advanced beyond the supporting plate 25 and into operative punching relation with respect to a card. As seen in Fig. 4, the teeth 66 of the backing plate 67 are operable for engaging any of the punches which may be advanced in the top or bottom horizontal rows of punches. The vertically disposed rows of punches are adapted and suitably slotted to be engaged by the vertical legs 68 and 69 of the backing plate 67, while the odd upper right-hand punch of said vertical row is engaged by the edge 70 of the backing plate as indicated in Fig. 4. The backing plate 67 is bodily slidable upon the pins 72 and 73 which are conveniently carried by the supporting plate 25. In connection with the punches 24, it should also be noted that their punching ends or cutting edges are preferably tapered as at 74 best illustrated in Figs. 2 and 15, for the purpose of causing a gradual shearing of the card during the notching operation instead of a sudden collective impact by all the punches such as would occur in the event that the cutting edges of said punches had been disposed in planes parallel to the face of the card.

Referring now to Fig. 2, a die block 75 is provided with apertures 76 which are aligned and shaped to receive the punches during the notching operation. This die block is movably related with respect to the casing 10 of the machine and is oppositely disposed from the supporting plate 25 and punches 24 in a manner clearly illustrated in Figs. 2 and 4. A stripper plate 77 suitably secured to the lower end of the die block 75 is spaced therefrom to form a card space 78 between the stripper and die block into which space the cards are automatically fed for the purpose of being notched by the punches 24. The lower edge of the cards C, one of which is shown in Fig. 2 is guided by any suitable means for positioning the card in proper vertical relation with respect to the four rows of punches rectangularly arranged as shown in Fig. 4. As seen in Fig. 2, the stripper is provided with an offset shoulder as at 79 for closing the gap between the stripper plate and the die block for the purpose of securing the stripper plate to said die block and for the purpose of guiding and supporting the lower edge of the index cards as the latter pass into and out of the machine. Obviously, the stripper plate is provided with corresponding apertures as shown at 80 in Fig. 4 for the purpose of accommodating the punches 24 as relative movement occurs between the punches and the die block for the purpose of notching the cards. The stripper plate moves directly with the die block as the latter advances a card toward the punches to be notched by the respective punches that have been advanced into operative card notching relation.

There are various ways in which the index cards may be advanced into the machine and discharged therefrom, but in the present machine as best illustrated in Figs. 1 and 3, the magazine 81 for holding and supporting the index cards is located at the left-hand side of the machine and in a position wherein the operator can read the data contained upon the cards for the purpose of setting up the keyboard for notching the card to code the same. The magazine 81 preferably comprises a container or trough 82 having a window 87a at one side and a suitably supported plunger 83 slidably carried by the wall 84 of the magazine and the supported bracket 85. Any form of resilient means such as the spring 86 may be interposed between the wall 84 and the plunger 83 for urging the card group forwardly in the magazine 81 of the machine and into aligned relation with respect to the card space 78 of Fig. 2, such position of the card being determined by the suitably positioned card window shown at 87a in Fig. 1a, which is large enough to show the whole card.

Each forward card of the magazine is fed into the card space 78 by means of a slidably supported rod 88 carrying a depending finger 89 which is adapted for contacting the outermost edge of the card and to move the same towards the machine and into operative punching relation with respect to the punches and die block. The prongs 90 of the finger 89 are for the purpose of advancing the card to the median line of the left-hand vertically disposed punches as best illustrated in Fig. 16 and the length of the feed stroke of the bar 88 and finger 89 is definitely controlled by the mechanism utilized for advancing rod 88. The card will stop and be frictionally held within the card space 78 at the end of the stroke of said card feeding mechanism. The finger 89 is also adjustably carried on the rod 88 by means of the screws 91a.

The drive of the machine to perform its cycle of operation may be accomplished in various ways. In the construction of the present machine, an electric motor 91 is utilized for constantly driving the inertia wheel 92 of a "one" revolution clutch 93 by means of the conical drive roller 94 on the motor shaft which engages the peripheral lip 95 of the inertia wheel 92 of the "one" revolution clutch. The clutch utilized is illustrated more in detail in Figs. 6 and 7 wherein the inertia wheel 92 carrying the lip 95 is adapted and suitably connected for constantly driving the star wheel 96 which is freely rotatable together with the inertia wheel 92 upon the main drive shaft 98 of the machine. A disc 99 carrying a suitable dog 100 is keyed to the shaft 98 by means of a pin 101 and the spring 102 acts to keep this dog in driving engagement with respect to the star wheel 96. As best viewed in Fig. 6, the trailing end of the dog 100 is provided with a cam 103 engageable by a roller 104 pivotally carried by the arm 105 which may be moved laterally with respect to the face of the clutch by means of the push rod 106. The rod 106 is connected at 107 to a bell crank 108, and the bell crank is operated by the stem 109 suitably connected with the machine operating key 110 as best shown in Figs. 1 and 2. By depressing the operating key 110, rod 106 is moved laterally with respect to the face of the clutch through the bell crank 108 so as to move the roller 104 laterally out of the path of the cam 103 whereby the dog 100 will move into operative engagement with one of the teeth of the revolving star wheel 96 to be directly driven by the motor 92 as hereinbefore described. Obviously, the release of the operating key 110 will immediately allow the roller 104 to reposition itself by means of the spring 111 into the path of the cam 103, so that the dog 100 will again be tripped out of operative relation with respect to the star wheel 96, after one revolution of the clutch has been completed.

During the single revolution of the clutch 93, all of the working parts of the machine will have moved through one complete cycle and are all driven by means of the common shaft 98 which has one end journalled in the mounting block 115, while the other rearward end of the shaft 98 may be otherwise suitably journalled on the casing 10 in any desirable manner. A rotary cam 117 is secured to shaft 98 and carries two separate cam tracks 118 and 119. The cam track 119 is engaged by a roller 120 secured to a slidable bar 121 which is guided in the mounting block 115 and by certain other members associated with the casing 10 for sliding forwardly and backwardly relative to said casing. The movable die block 75 is secured as by brackets 121a to the slide 121, so that any movement of the slide 121 as controlled by the cam track 119 acting on roller 120 will be directly imparted to the die block 75 and its associated stripper bar for moving any card disposed in the space 79 toward and away from the cutting ends of the punches 24. The amount of the movement of the die block 75 is such that any punches 24 that are advanced into punching position shall be engaged to notch and suitably pierce a card and to enter the openings or apertures 76 in the die block 75 during the notching operation.

The other cam track 118 of the rotary cam 117 is adapted for moving the roller 123 and its supporting rod 124 to effectively rotate the crank arm 125 and the cross shaft 126 for causing the movement of the clearing bar 127 upwardly towards all of the key bars 17 and 18 by means of the arms 128 also secured to shaft 126. This mechanism is very clearly illustrated in Fig. 2 and in the perspective view in Fig. 5. Upon movement of the clearing bar 127 towards the key bars, all of the key bars that have been advanced for placing certain punches into operative relation will be positioned with their respective clearing lugs 130 also advanced into locations wherein the clearing bar 127 will engage the cam surfaces 131 thereon. As the clearing bar 127 moves upwardly, it will move the advanced clearing lugs 130 toward the rear of the machine and the corresponding key bars will also be moved rearwardly for unlatching all of the depressed keys from the undercut portions 41 and 42, respectively, of the cam lugs 27 and 28 of the key bars 17 and 18. During the clearing action of bar 127, all of the lugs 130 and their respective cam surfaces 131 on all of the unadvanced key bars are normally positioned forwardly of the clearing motion of said bar, and consequently, all unadvanced bars remain stationary and unaffected by the clearing action of the bar 127.

This will provide the automatic clearing means for releasing all of the depressed keys at the end of each cycle of operation of the machine. In the event that manual clearing of the machine shall be necessary, the operator need only depress the clearing key 132 best shown in Figs. 1 and 5, and this clearing key is provided with a depending stem 133 for engaging the pin 134 carried by the lever 135 contiguous with one of the arms 128 of the clearing bar 127. The connection between the stem 133 and the pin 134 is such that the automatic clearing of the machine which rocks the crank arms 125, arms 128 and 135 in a counterclockwise direction will have no effect upon the manual clearing key 132 since pin 134 will move away from the end 133 of the clearing key.

With the present machine it is also possible to prevent the clearing of the machine during the cycle of operation for the purpose of duplicating the notching operation on one or more subsequent index cards. For this purpose, the repeat key 137 as shown in Figs. 1 and 5 may be utilized. Key 137 is provided with a stem 138 having a cam groove 139 for engaging a pin 140 carried by a suitable bushing 141 secured to the shaft 126. The shaft 126 and its associated mechanisms are all arranged and disposed to be shifted laterally with respect to the machine against the action of the spring 142, and the latter is adapted for returning all of said parts to their normal position as illustrated in Fig. 5. As viewed in Fig. 5, rod 124 that is shiftable by means of the cam track 118 and roller 123 is suitably notched as at 143 for receiving the end of the pin 144 through which the normal clearing operation is effected. The notch 143 is wide enough to accommodate the hand clearing action of key 132 whereby the clearing bar is rotated against the action of the spring that is connected with one of the arms 128 for normally keeping the pin 144 against the forward end of the notch 143 as viewed in the machine. In the event that the notching of one or more cards shall be repeated, the operator will depress the repeat key 137, and shaft 126 and all of its associated mechanisms will be moved bodily laterally by means of the groove and pin connection 139 and 140 whereby pin 144 will be moved out of the slot 143 in shaft 124. Therefore, as long as the repeat key is maintained in depressed position, the clearing rod 124 will be ineffective by reason of the separation of the pin 144 from within the slot 143 in the clearing rod 124. It should also be noted that although the pin 144 moves out of the notch 143, no rotation of the clearing bar 127 and its associated mechanisms will occur since the relatively long pin 134 will move relative to the end of key 133 and will still be in contact therewith and consequently blocked as to rotation against the action of the spring on the near arm 128 as viewed in Fig. 5.

The manner in which the punch locking backing plate is operated is best shown in Figs. 2, 3 and 4 wherein a cam 145 fixedly mounted on shaft 98 is operated for engaging the roller 146 pivotally carried in the bell crank 147 suitably pivoted at 148. The other arm of the bell crank 147 has a pin connection as at 149 with the backing plate 67 and the spring 150 connected to the lever 151 of the bell crank 147 normally maintains the roller 146 against the cam 145 and also holds the backing plate in its inoperative position against its supporting pins 72 and 73 as best shown in Fig. 4. When the punches are advanced and the backing plate 67 moves into the punch notches 65, the plate functions to take the punching strain so that the latter will not be transmitted through the punches to arms 22 or 23 and their connected key bars 17 and 18 or to other connected members.

The card feed is accomplished by means of a cam 155 secured to shaft 98 and which engages the roller 156 on the lever 157 which is also pivotally supported on the shaft 148. A suitable spring 158 will normally maintain the roller 156 in following contact with the cam 155. The outer end of the lever 157 is provided with a gear segment 159 for meshing with a pinion 160 fixedly carried on the pivoted shaft 161. Shaft 161 is rotatably mounted in the mounting block 115 and also carries a large gear 162 which is adapted to engage the gear rack 163 of the slidably movable card feeding rod 88.

The cycle of operation of the machine may best be explained with reference to the cam timing diagram in Fig. 17. When the operator wishes to notch a card, the keyboard is set up by initially depressing certain keys according to the information read from the card to the left of the machine and in the magazine, and possibly additional keys may be depressed as determined from collateral information directly relating to the card that is exposed in the card magazine. After certain of the keyboard keys have been depressed, the operator pushes the clutch operating key 110 which sets the "one" revolution clutch 93 into motion for driving the shaft 98 through one complete revolution and, consequently, for one complete cycle of operation of the machine. As the shaft 98 begins to rotate and as seen in Fig. 17, it is preferable that nothing should occur at the first portion of the cycle of operation, but eventually the cam for advancing the card actuates the card feeding mechanism for moving the card which is being coded into operative relation with respect to the punching mechanism. Any card which has remained in the machine will be moved out of the machine by the leading edge of the advancing card. During the advancing of the new card, the backing plate is also moved into locking relation with respect to the punches advanced through the keyboard selection. Thereafter, the circular cam 117 will cause the track 119 and roller 120 to move the sliding bar 121 for moving the die block 75 and the card C which is now lodged between the die block and stripper plate 77. This movement will be sufficient to cause the advanced punches to notch the card. After the notching operation has been performed, the center cam track 118 will cause the clearing mechanism to operate for releasing the keys to return all of the keys of the machine to their normal inoperative position. There may be certain variations in the exact timing sequences of operation of the different cams, but the operation of the present device will preferably conform substantially with the cam timing diagram illustrated in Fig. 17.

Obviously, by using the double sided punches as illustrated in Figs. 4 and 15, it is necessary to provide means for drawing the discharging cards out of the machine as such discharging cards are being moved by each next advancing card. This may be done by the arrangement illustrated in Figs. 1, 2 and 3 by means of a frictionally driven roller 165 contacting the inertia wheel 92 of the clutch 93, and roller 165 drives a suitably supported shaft 166 and the pulley 167. A second roller 168 is mounted for frictionally contacting the face of each card being discharged and is driven by means of the belt 169 and pulley 170. Cooperating with the roller 168 is the plate 171 disposed to normally maintain the cards in operative contacting position with respect to the wheel 168. Preferably the peripheral speed of the wheel 168 is greater than the lineal speed of the discharging card whereby said card is pulled out of the machine and deposited in suitable trays or other means as desired. Obviously, this extra feed mechanism could be dispensed with in theory if the punches at the right-hand side of the machine are made single or one sided punches instead of double sided punches in which case the card which has been moved out of the machine may remain in contact with the leading edge of the following card to be punched, without interference or action by any of the right-hand vertical row of punches.

To supplement the regular operation of the machine, certain templets in the form of blocking and presetting templets may be employed for initially blocking the operation of certain key bars or vice versa for initially advancing certain key bars and presetting a number of the punches for definitely notching a card as per the combination of the presetting templet. For this purpose, the front wall of the machine as best illustrated in Fig. 8 has been provided with suitable aligned openings 173 for permitting the forward ends of the key bars to project therethrough in the manner illustrated in Figs. 2 and 10. The presetting templet as shown in Fig. 31 and as indicated at 174 is provided with suitable projections or teeth 175 all located in a predetermined arrangement and being positioned opposite the ends of certain single or grouped bars such as 17 and 18. Each of the presetting templets is provided with suitable slots 176 for placing the same over spaced studs 177 which are secured to the front face of the casing 10 of the machine. Suitable knurled nuts 178 are provided for moving the templets against the projecting ends of the key bars whereby all of the key bars engaged by the projections or teeth 175 of the presetting templet shall be moved rearwardly of the machine from the position shown in Fig. 10 to the position shown in Fig. 11. Obviously, this will advance certain punches into operative notching relation with respect to the cards to be notched. Also, other keys may be depressed which are not affected by the presetting referred to.

The blocking templet as illustrated in Fig. 32 and indicated at 180 is similarly provided with projections or teeth 181, but it is to be noted that in the blocking templet these projections are reversed and depend downwardly instead of projecting upwardly as do the projections 175 of the presetting bar 174. The blocking bar is also provided with suitable slots 182 for engaging the studs 177 so that the bar may be secured in place by the knurled nuts 178. However, the projections 181 of the blocking templets are adapted to enter the notches 183 of the key bars, such notches being positioned flush with the outer surface of the front wall of the machine, so that the depending lugs 181 will lie within the notches 183. This will prevent the operation of any of the keys associated with the key bars which are blocked by the blocking templet, leaving free however, any of the other keys which are not affected by this relation.

All of the foregoing description has been directed to the normal operation of the machine for notching cards of the 3¼ inch by 7½ inch size. By using a spacer 189 as shown in Fig. 33 which is provided with the horizontal positioning member 190 having an edge adapted to lie in the median plane of the upper horizontal row of punches to support other sized cards so that the latter can also be suitably notched. The spacer may be a flat solid rectangular piece of cardboard or the like and may or may not be notched for clearance. The spacer illustrated is provided with depending legs 191 notched as at 192 for the purpose of engaging the rod 106 at one side of the machine and a suitable pin 193 at the other side of the machine for definitely positioning said spacer. A suitable handle 194 may be extended from one leg for the purpose of hand-setting said spacer into the position referred to. The upper end of the spacer is also notched as at 195 for the purpose of clearance to avoid being contacted by the lower halves of the upper punches. Suitable cards such as shown at 196 in full lines and at 197 in broken lines may then be individually positioned upon the spacer to have the lower edges thereof notched for the purpose of coding said cards. Obviously, other reference markings may be made on the machine itself or other suitable positioning clips or guides may be employed for placing the cards 196 and 197 in their proper lateral relation with respect to the width of the machine and with respect to the punches. Also, when utilizing a spacer such as 189, the feed finger 89 may be released from the feed rod 88 or other suitable disconnecting mechanisms may be employed to prevent operation of the feed finger 89 that is only utilized with the 3¼ inch by 7½ inch size index cards. For the purpose of further accommodating large cards with the spacer 189 in place, the upper horizontal row of punches has been extended as at 197 and 198 in Fig. 12 and the corresponding punch openings are well shown in Fig. 4.

Although the spacer 189 may be used as described for both large and small cards, it is primarily for the purpose of supporting cards of less height than the standard card height of 3¼ inches and to thereby hold the same in a raised position accessible to the hand. All cards of a greater height than the 3¼ inch height of the standard card and which are high enough to be hand positioned in the usual card space 78 of the machine, can be supported on the ledge 79 and notched with the lower row of punches.

It is obvious that various modifications may be resorted to in the construction of the present machine. Therefore, the preferred form of the present device should only be limited to the general arrangement and combinations of parts disclosed as shall be governed by the breadth and scope of the appended claims.

What I claim as new and desire to secure by Letters Patent is:

1. A machine for notching perforated cards of indexing systems comprising a plurality of punches arranged for simultaneously notching a card at any perforation or group of perforations on all edges thereof, key operated means for selectively moving the desired punches in a direction at right angles to the plane of the card, to a position adjacent the card in operative relation thereto for so notching said card, and means cooperating with the positioned punches for causing said positioned punches to simultaneously notch the card.

2. A machine for notching perforated cards of indexing systems comprising a plurality of key operated punches arranged in rows substantially coincident with all of the card perforations, means associated with the keys to move selected punches in a direction at right angles to the plane of the card, to a position adjacent the card, and means for simultaneously causing pre-selected set punches or groups of punches to notch the card and to thereby codify the latter.

3. A machine for notching polygonal cards peripherally perforated for indexing systems comprising a plurality of key operated punches disposed in coincidental alignment with said peripheral perforations of said cards, means associated with the keys to move selected punches in a direction at right angles to the plane of the card, to a position adjacent the card, and means for simultaneously causing pre-selected set punches or groups of punches to notch the card and to thereby codify the latter.

4. A machine for notching peripherally perforated cards of indexing systems comprising a plurality of key operated punches each aligned with the individual perforations on said cards and all arranged to follow the contour of said series of card perforations, means associated with the keys to move selected punches in a direction at right angles to the plane of the card, to a position adjacent the card, and means for operatively causing said card to be notched simultaneously by certain pre-selected set individual or groups of individual punches to code said card.

5. A machine for notching rectangular cards for indexing systems wherein each card has perforations arranged in a rectangle and around the edges of said card, comprising a plurality of punches arranged in a rectangle with each punch opposite a card perforation, means for selectively setting individual punches or combination of punches into operative punching relation to said card, and means for causing said card to be notched at perforations opposite to the punches selected to thereby codify said card.

6. A machine for notching cards comprising a plurality of key operated notching punches normally disposed in inoperative relation to a card, a keyboard for selectively advancing certain of said punches in a direction at right angles to the plane of the card, into operative notching position, and means for moving said card toward said advanced punches to be notched thereby.

7. A machine for notching cards comprising a prearranged group of notching punches normally disposed in inoperative relation with respect to a card, key operated means for selectively advancing certain of said punches in a direction at right angles to the plane of the card, into operative notching position with respect to said card, and means for moving said card toward said advanced punches to be notched thereby.

8. A machine for notching cards comprising a group of prearranged notching members normally disposed in inoperative relation with respect to a card, key operated selective mechanism for advancing certain of said notching members in a direction at right angles to the plane of the card, into operative notching position with respect to one side of said card, an apertured member disposed on the other side of said card and adapted for receiving said notching members, and means for causing relative movement between said advanced notching members and said apertured member to cause said card to be notched in a predetermined pattern for codifying the same.

9. A machine for notching cards comprising a plurality of notching punches, a keyboard mechanism connected with said punches and providing individual keys with indicia for selectively causing individual punches, to be rendered operative for notching a card, and other keys, each for selectively causing groups of punches to be simultaneously rendered operative for notching a card by the action of a single key, and means for causing said card to be notched in one operation by said selected punches and/or groups of punches to codify said card as per selection of keys.

10. A machine for notching perforated cards of indexing systems comprising a plurality of notching punches, a keyboard mechanism connected with said punches and providing keys with indicia for selectively causing individual punches to be moved into operative position, and other keys, each for selectively causing groups of punches to be simultaneously moved into operative position for notching a card by the action of a single key, certain of said keys being adapted to actuate individual punches and certain other of said keys being adapted to simultaneously actuate a plurality of punches into operative position with respect to a card, and means for causing said card to be notched in one operation by said key selected punches and/or groups of punches to codify said card.

11. A machine for notching perforated cards of indexing systems comprising a plurality of notching punches, a keyboard mechanism connected with said punches and providing keys as indicia for selectively moving certain individual punches into operative position, and other keys, each for selectively moving groups of punches simultaneously into operative position for notching a card, certain of said keys being adapted to move one punch per key stroke into said operative position, and certain other of said keys being adapted to simultaneously move combinations of punches per key stroke into said operative position, and means for causing said cards to be notched in one operation by said key selected punches.

12. In a machine for notching perforated cards of indexing systems, the combination of a plurality of notching punches, a keyboard mechanism connected with said punches and providing keys for automatically advancing one or more punches into operative position for notching a card, and means for causing relative movement between said card and said advanced punches to cause the latter to notch said card to codify the same.

13. In a machine for notching peripherally perforated cards of indexing systems, the combination of a series of notching punches arranged for individually notching said card perforations simultaneously and along any or all edges thereof, a keyboard mechanism connected with said punches and having a key for each individual punch and additional keys for combinations of certain of said individual punches, said individual punches or combinations of punches being advanced into card notching relation by selected corresponding keys, and means for causing said advanced punches to notch said card to code the same.

14. A machine for notching cards comprising a prearranged group of notching punches normally disposed in inoperative relation with respect to a card, means for blocking certain of said punches to maintain the same in said inoperative relation with respect to said card, means for selectively choosing and advancing certain of the unblocked punches into operative notching position with respect to said card, and operative means for causing said card to be notched by all of said advanced punches.

15. A machine for notching cards comprising a prearranged goup of notching punches normally disposed in inoperative relation with respect to one side of a card, selective actuating mechanism for moving said punches into operative card notching position adjacent said one side of the card, locking means adapted for cooperating with said actuating mechanism for preventing the selective actuation of certain predetermined individual punches and/or combinations of individual punches into operative notching relation with respect to the card, all of said remaining punches being selectively actuatable, and means for moving said card bodily toward said punches to be notched by any of said unlocked punches that are disposed in operative relation with respect to said card by said mechanism.

16. A machine for notching cards comprising a prearranged group of notching punches normally disposed in inoperative relation with respect to one side of a card, selective actuating mechanism for moving said punches into operative card notching position adjacent said one side of the card, a templet adapted for coacting with said actuating mechanism to lock certain predetermined individual punches and/or combinations of individual punches in inoperative notching relation with respect to said card, all of said remaining punches being freely operable by said mechanism, and card supporting means disposed for moving said card bodily toward said punches to be notched by any of said unlocked punches that are disposed in operative relation with respect to said card by said mechanism.

17. A machine for notching cards comprising a prearranged group of notching punches normally disposed in inoperative relation with respect to a card, means for pre-setting certain of said punches to move the latter into operative notching relation with respect to said card, means for selectively choosing and advancing any one or more of the punches not affected by said pre-setting means into operative notching relation with respect to said card, and operative mechanism for moving said card into contact with all of said operatively advanced punches to be notched thereby for coding said card.

18. A machine for notching cards comprising a plurality of punches normally disposed in inoperative relation with respect to a card, selective actuating mechanism for advancing said punches into operative card notching position adjacent said card, pre-setting means adapted to cooperate with said selective actuating mechanism to cause certain individual punches and/or groups of individual punches to be advanced into operative relation to said card, whereby all of said unadvanced punches remain operable to be advanced by said selective actuating mechanism, and means for bodily moving said card into notching contact with all of the advanced punches to be notched thereby for coding said card.

19. A machine for notching cards comprising a plurality of punches normally disposed in inoperative relation with respect to a card, selective actuating mechanism for advancing said punches into operative card notching position adjacent said card, a pre-setting templet adapted for coaction with said selective actuating mechanism to advance certain individual punches and/or groups of individual punches into operative relation with respect to said card, whereby all of said unadvanced punches remain operable to be advanced by said selective actuating mechanism, and movable card supporting means for bodily moving said card into notching contact with all of the advanced punches to be notched thereby for coding said card.

20. A machine for notching cards comprising a plurality of notching punches normally disposed in retracted and inoperative relation with respect to a card, a keyboard operatively connected with said punches for selectively advancing certain of said punches into operative notching relation with respect to said card, means for actively blocking the operation of certain of the keys of the keyboard to prevent the advance of any of the punches associated with said blocked keys, the balance of the keys of the keyboard remaining free and operable to advance the punches associated therewith, and means for causing relative movement between said card and the advanced punches to cause notching of said card to codify the same.

21. A machine for notching cards comprising a plurality of notching punches normally disposed in retracted and inoperative relation with respect to a card, a keyboard operatively connected with said punches for selectively advancing certain of said punches into operative notching relation with respect to said card, presetting means for coacting with said keyboard to advance certain pre-selected punches into operative notching relation with respect to said card, the remaining retracted punches being operable by the corresponding keys on said keyboard to selectively move certain of said punches into advanced operative relation to said card, and means for causing relative movement between said card and the advanced punches to cause notching of said card to codify the same.

22. In a machine for notching perforated cards, the combination of cooperative card notching units disposed on opposite sides of a card receiving space, one of said units comprising a plurality of movable notching members ineffectively positioned adjacent said card receiving space and selective means for advancing certain of said notching members into operative relation in said space with respect to said other unit, a card holding magazine, card feeding means for moving a card from said magazine into said card space between said units and at an angle to said advanced notching members, guide means for preventing said card from engaging any of said advanced notching members, and operable mechanism adapted for causing relative movement between said units whereby said card is notched by said selected and advanced notching members.

23. In a machine for notching perforated cards, the combination of cooperative card notching units disposed on opposite sides of a card receiving space, one of said units comprising a plurality of movable notching members ineffectively positioned adjacent said card receiving space and selective means for advancing certain of said notching members into operative relation in said space with respect to said other unit, a card holding magazine, card feeding means for moving a card from said magazine into said card space between said units and at an angle to said advanced notching members, guide means for preventing said card from engaging any of said advanced notching members, and operable mechanism adapted for causing relative movement between said units toward and away from each other, respectively, said units acting to notch said card as said units move relatively toward each other, and said guide means acting to strip said card from said advanced members of said one unit as said units move relatively away from each other.

24. In a machine for notching perforated cards, the combination of cooperative card notching units disposed on opposite sides of a card receiving space, one of said units comprising a plurality of movable notching members ineffectively positioned adjacent said card receiving space and selective means for advancing certain of said notching members into operative relation in said space with respect to said other unit, a card holding magazine positioned adjacent said card space and adapted for exposing each subsequent top card in clear view of the machine operator prior to notching, and card feeding means for moving each top card into said card space and into notching relation to said punches and operably connected mechanism adapted for causing relative movement between said units whereby said card is notched by said selected and advanced notching members.

25. In a machine for notching perforated cards, the combination of cooperative card notching units disposed on opposite sides of a card receiving space, one of said units comprising a plurality of movable notching members ineffectively positioned adjacent said card receiving space and selective means for advancing certain of said notching members into operative relation in said space with respect to said other unit, a card holding magazine positioned adjacent said card space and adapted for exposing each subsequent top card in clear view of the machine operator prior to notching, and card feeding means for moving each top card into said card space and into notching relation to said punches and the other of said units comprising movable die mechanism for bodily urging said advanced card into notching engagement with said advanced notching members to be coded by the latter.

26. In a machine for notching perforated cards, the combination of cooperative card notching units disposed on opposite sides of a card receiving space, one of said units comprising a plurality of movable notching members ineffectively positioned adjacent said card receiving space and selective means for advancing certain of said notching members into operative relation in said space with respect to said other units, a card holding magazine positioned adjacent said card space and adapted for exposing each subsequent top card in clear view of the machine operator prior to notching, and card feeding means for moving each top card into said card space and into notching relation to said punches, and the other of said units comprising movable die mechanism for bodily urging said advanced card in one direction into notching engagement with said advanced notching members to be coded by the latter, said movable die mechanism including means for stripping said card off of the notching members subsequent to the notching thereof and when said die mechanism bodily moves said card oppositely to said one direction.

27. In a machine for notching perforated cards, the combination of cooperative card notching units disposed on opposite sides of a card receiving space, one of said units comprising a plurality of movable notching members ineffectively positioned adjacent said card receiving space and selective means for advancing certain of said notching members into operative relation in said space with respect to said other unit, a card feeding means for advancing a card into said card space and at right angles to the axes of the punches, and operable mechanism connected with the other of said units for moving said advanced card bodily in the direction of the axes of said punches whereby said card is notched by said selected and advanced notching members.

28. In a machine for notching perforated cards of indexing systems, the combination of a plurality of keys, a plurality of slidable key bars, card notching punches connected with each of said key bars, cooperative means carried by said keys and bars, respectively, whereby certain selected punches or combinations of punches may be advanced into operative relation with respect to a card, means to lock the advanced punches in advanced position, and means for causing said card to be notched by all of the advanced punches.

29. In a machine for notching perforated cards of indexing systems, the combination of a plurality of keys disposed in rows, a plurality of slidable key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance more than one of the key bars simultaneously into said operative relation with respect to said card, means to lock advanced keys in advanced position, and means for causing said card to be notched by all of the advanced punches.

30. In a machine for notching perforated cards of indexing systems, the combination of a plurality of keys disposed in rows, a plurality of key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance more than one of the key bars simultaneously into said operative relation with respect to said card, synchronous means for locking all of the advanced punches into said operative relation to said card, and means for causing said card to be notched by all of the advanced and locked punches.

31. In a machine for notching perforated cards of indexing systems, the combination of a plurality of keys disposed in rows, a plurality of key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance by a single key more than one of the key bars simultaneously into said operative relation with respect to said card, said cooperative means including locking members for maintaining operated keys in depressed position to hold the corresponding key bars and related punches in advanced position and to guide the operator, and die means for causing said card to be simultaneously notched by all of said advanced punches to code the same.

32. In a machine for notching perforated cards of indexing systems, the combination of a plurality of keys disposed in rows, a plurality of key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance more than one of the key bars simultaneously into said operative relation with respect to said card, said cooperative means including locking members for maintaining operated keys in depressed position to hold the corresponding key bars and related punches in advanced position and to guide the operator, synchronous means for locking all of the advanced punches into said operative relation to said card, and means for causing said card to be notched by all of the advanced and locked punches.

33. In a machine for notching perforated cards of indexing systems, the combination of a plurality of keys disposed in rows, a plurality of key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance more than one of the key bars simultaneously into said operative relation with respect to said card, said cooperative means including locking members for maintaining operated keys in depressed position to hold the corresponding key bars and related punches in advanced position and to guide the operator, synchronous means for locking all of the advanced punches into said operative relation to said card, means for causing said card to be notched by all of the advanced and locked punches, and releasing mechanism for returning said depressed keys to inoperative raised position and restore said punches and their corresponding key bars to inactive position.

34. In a machine for notching perforated cards of indexing systems, the combination of a plurality of keys disposed in rows, a plurality of key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance more than one of the key bars simultaneously into said operative relation with respect to said card, said cooperative means including locking members for maintaining operated keys in depressed position to hold the corresponding key bars and related punches in advanced position and to guide the operator, synchronous means for locking all of the advanced punches into said operative relation to said card, means for causing said card to be notched by all of the advanced and locked punches, and releasing mechanism for returning said depressed keys to inoperative raised position and to restore said punches and their corresponding key bars to inactive position, said releasing mechanism including manually operable repeat means for rendering said releasing mechanism ineffective to prevent clearing of the machine, whereby the same notching and coding operation is repeated on a subsequent card.

35. In a machine for notching perforated cards of indexing systems, the combination of a plurality of keys disposed in rows, a plurality of key bars for each row of keys, card notching punches connected with each of said key bars, cooperative means carried by the keys in each row and by the respective key bars for said row, respectively, whereby certain of said keys may advance certain individual key bars and their connected punches into operative relation with respect to a card, and whereby certain other of said keys may advance more than one of the key bars simultaneously into said operative relation with respect to said card, said cooperative means including locking members for maintaining operated keys in depressed position to hold the corresponding key bars and related punches in advanced position and to guide the operator, synchronous means for locking all of the advanced punches into said operative relation to said card, means for causing said card to be notched by all of the advanced and locked punches, and releasing mechanism for returning said depressed keys to inoperative raised position and to restore said punches and their corresponding key bars to inactive position, said releasing mechanism including manually operable repeat means for rendering said releasing mechanism ineffective to prevent clearing of the machine, whereby the same notching and coding operation is repeated on a subsequent card, and said releasing mechanism having additionally connected manually operable means for causing the clearing of any of said depressed keys at any time prior to the notching operation and the simultaneous return of the key bars and punches corresponding to said last mentioned keys.

36. In a machine of the class described wherein the notching punches are arranged in rows for simultaneously notching the entire peripheral edge of an index card of fixed size, the combination of an insertible spacer member having one edge thereof positioned in fixed relation with respect to one of the rows of punches, whereby said one edge of said spacer member functions as a card guide for placing cards of larger or smaller sizes than said fixed size of card into notching relation with said one row of punches.

37. In a machine of the class described wherein the notching punches are arranged in rows for simultaneously notching the entire peripheral edge of an index card of standard size, the combination of cooperative card notching means having a card receiving space for said standard size of index card, said punches in one of said rows being double sided for punching the top edge of said card along with said other rows of punches, and spacer means detachably insertible into said card space to provide a raised supporting ledge for index cards of less height than the height of said standard card and whereby said one row of punches also functions to notch the bottom edges of cards supported in raised position upon said spacer means.

38. In a machine of the class described wherein the notching punches are arranged in rows for simultaneously notching the entire peripheral edge of an index card of fixed size, of cooperative card notching means having a card receiving space for said fixed size of index card, and spacer means to provide a guiding ledge for supporting one edge of individual index cards of greater or smaller sizes than said fixed size of card, said spacer means being detachably supported in said space to position said guiding ledge in a fixed relation to one of the rows of punches, whereby said cards of larger or smaller sizes may be supported in an accessible position and wherein they may be individually notched by said one row of punches.

39. In a machine of the class described, the combination of a keyboard having a plurality of keys and associated means for positioning a plurality of individual punches or groups of punches per key stroke into operative relation with respect to an index card, punch locking mechanism, card feeding mechanism, die mechanism for bodily moving a fed card into notching relation with respect to said advanced punches, and power operated manually controlled drive means including synchronously operable units timed and connected for actuating each of said aforesaid mechanisms, respectively, said drive means including clearing mechanism for restoring said operated keys and the corresponding punches to their normal inactive positions prior to the completion of the end of the cycle of operation of said machine.

HYMAN E. GOLBER.